(12) United States Patent
Steiner

(10) Patent No.: US 7,823,487 B2
(45) Date of Patent: Nov. 2, 2010

(54) CUTTING TOOL

(75) Inventor: Michael Steiner, Breitenwang (AT)

(73) Assignee: Ceratizit Austria Gesellschaft M.B.H., Reutte (AT)

( * ) Notice: Subject to any disclaimer, the term of this patent is extended or adjusted under 35 U.S.C. 154(b) by 39 days.

(21) Appl. No.: 12/205,213

(22) Filed: Sep. 5, 2008

(65) Prior Publication Data

US 2009/0003951 A1 Jan. 1, 2009

Related U.S. Application Data

(63) Continuation of application No. PCT/AT2007/000109, filed on Mar. 5, 2007.

(30) Foreign Application Priority Data

Mar. 7, 2006 (AT) .............................. GM173/2006

(51) Int. Cl.
*B23B 1/00* (2006.01)
*B23B 27/10* (2006.01)

(52) U.S. Cl. ............................................ 82/50; 407/11

(58) Field of Classification Search ................... 407/11, 407/100; 82/50, 901, 900; 408/56, 57, 60, 408/61
See application file for complete search history.

(56) References Cited

U.S. PATENT DOCUMENTS

| | | | |
|---|---|---|---|
| 3,173,273 A | 3/1965 | Fulton | |
| 3,208,229 A | 9/1965 | Fulton | |
| 3,561,299 A * | 2/1971 | Brisk et al. | 408/59 |
| 3,971,114 A * | 7/1976 | Dudley | 407/120 |
| 4,973,247 A * | 11/1990 | Varnes et al. | 433/85 |
| 5,006,021 A | 4/1991 | Wheetley | |
| 5,103,701 A | 4/1992 | Lundin et al. | |
| 5,799,553 A | 9/1998 | Billatos | |
| 5,901,623 A * | 5/1999 | Hong | 82/50 |
| 6,705,805 B2 | 3/2004 | Lagerberg | |
| 2003/0110781 A1 | 6/2003 | Zurecki et al. | |

FOREIGN PATENT DOCUMENTS

| | | |
|---|---|---|
| DE | 42 00 808 A1 | 9/1993 |
| DE | 196 40 599 A1 | 4/1998 |
| DE | 10 2004 040 166 A1 | 3/2006 |
| JP | 2-24040 A | 1/1990 |
| WO | 02/068142 A1 | 9/2002 |
| WO | 03/022517 A2 | 3/2003 |

OTHER PUBLICATIONS

International Search Report, dated Jul. 11, 2007.
Austrian Search Report, dated Nov. 17, 2006.

* cited by examiner

*Primary Examiner*—Will Fridie, Jr.
(74) *Attorney, Agent, or Firm*—Laurence A. Greenberg; Werner H. Stemer; Ralph E. Locher

(57) ABSTRACT

A cutting tool for machining by chip removal has a supply of a cold-gas flow for cooling the immediate machine-cutting region. Accordingly, in this case, the cold-gas flow is supplied internally and is generated by a low-temperature generator, which is integrated into the tool main body and which, via a vortex tube, converts compressed gas from normal temperature into a cold-gas flow and a warm-gas flow.

5 Claims, 4 Drawing Sheets

FIG. 4A
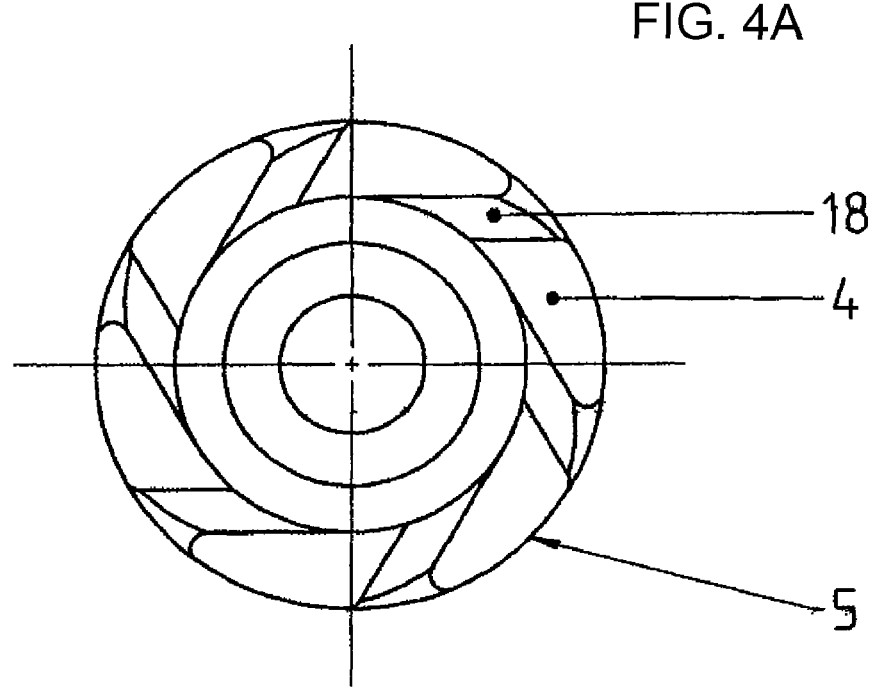
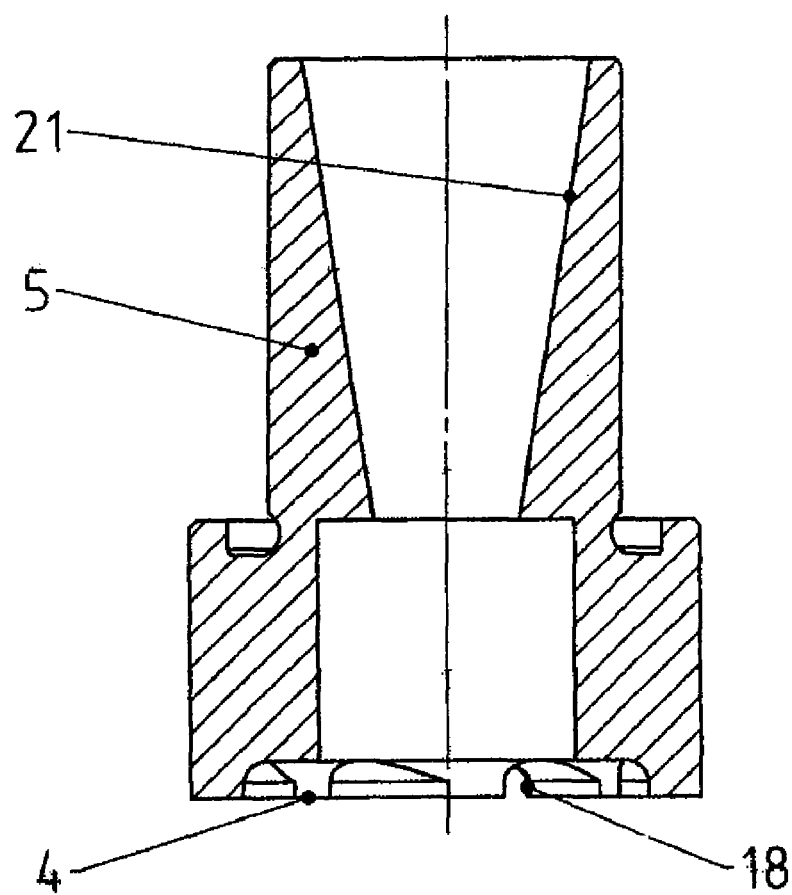
FIG. 4B

CUTTING TOOL

CROSS-REFERENCE TO RELATED APPLICATION

This is a continuation, under 35 U.S.C. §120, of copending international application No. PCT/AT/2007/000109, filed Mar. 5, 2007, which designated the United States; this application also claims the priority, under 35 U.S.C. §119, of Austrian patent application No. GM 173/2006, filed Mar. 7, 2006; the prior applications are herewith incorporated by reference in their entirety.

BACKGROUND OF THE INVENTION

1. Field of the Invention

The invention relates to a cutting tool for machining by chip removal, having a supply of a cold-gas flow for cooling the immediate machine-cutting region.

In the case of machine-cutting of metallic materials in particular, a substantial amount of heat is produced in the immediate machine-cutting region, which can result in premature wear or failure of the machine-cutting tool. In order to keep this temperature production within limits and, at the same time, to improve the discharge of the chips from the machine-cutting region, it is usual for the immediate machine-cutting region of the cutting tool to be cooled by supplying a coolant. The coolant in this case may be gaseous or liquid, and routed by an internal supply via the cutting tool or by a supply via external arrangements to the immediate machine-cutting region.

A cutting tool with an internal supply for a liquid coolant is described, for example, in international patent disclosure WO 02/068142, corresponding to U.S. Pat. No. 6,705,805 B2.

Described in published, non-prosecuted German patent application DE 196 40 599 A1 is a cutting tool having an internal coolant supply, wherein cooled air is used for cooling the immediate machine-cutting region. A disadvantage in the case of this cutting tool is that the cold air must be produced, not within the tool, but outside the cutting tool and external equipment must be provided, in turn, for this purpose.

The production of cold gases in a low-temperature generator operating according to the Joule-Thompson effect through the supply of compressed gas, preferably compressed air, has likewise been known for a long time. The principle of such low-temperature generators is based on the operation of a vortex tube. In this case, compressed air is supplied to the vortex tube via a gas vorticizer in a vortex chamber, at normal temperature and at a few bars of pressure, and divided into a cold-air flow and a hot-air flow. The compressed air supplied to the vortex tube via the gas vorticizer is moved, circulating at high speed, along the inner wall of the vortex tube in the direction of a hot-gas nozzle at one end of the vortex tube. A portion of the air escapes, as a hot-air flow, through the hot-gas nozzle. The air that has not escaped is forcibly routed back, through the center of this air flow passing at high speed at the edge of the tube, in the opposite direction and at a substantially slower speed to the other end of the vortex wheel. This inner, slower air flow gives off heat to the outer, faster air flow and, up to the outlet at a cold-gas nozzle, cools to temperatures of down to 40° C.

Such low-temperature generators are described, for example, in U.S. Pat. Nos. 3,173,273 and 3,208,229, and are used in multiple instances as an external arrangement for the external supply of cold air into the immediate machine-cutting region of cutting tools.

It is disadvantageous in such cases that such external arrangements have to be individually aligned to each machine-cutting tool and fixed in place in such a way that the targeted supply of the cooling air flow into the immediate machine-cutting region remains assured, even in the case of an advance motion of the machine-cutting tool. This, however, can only be achieved with a substantial resource input.

SUMMARY OF THE INVENTION

It is accordingly an object of the invention to provide a cutting tool that overcomes the above-mentioned disadvantages of the prior art devices of this general type, which has cooling of an immediate machine-cutting region by a cold-gas flow, wherein there is no requirement for equipment resources for the exact alignment of the gas flow.

With the foregoing and other objects in view there is provided, in accordance with the invention, a cutting tool for machining by chip removal. The cutting tool contains a tool main body having an immediate machine-cutting region and an internal channel system formed therein for supplying a cold-gas flow for cooling the immediate machine-cutting region. A gas vorticizer is disposed in the tool main body. A low-temperature generator is integrated into the tool main body. The low-temperature generator has an elongate vortex tube for converting a compressed gas, supplied via the gas vorticizer, from a normal temperature into the cold-gas flow and a warm-gas flow. The low-temperature generator further has a cold-gas outlet at a first end of the vortex tube and a hot-gas outlet at a second end of the vortex tube.

This is achieved, according to the invention, in that the cutting tool has a low-temperature generator integrated into the tool main body and has an internal channel system for supplying the cold-gas flow. The low-temperature generator is formed of an elongate vortex tube for converting a compressed gas, supplied via a gas vorticizer, from normal temperature into a cold-gas flow and a warm-gas flow, a cold-gas outlet at one end of the vortex tube, and a hot-gas outlet at the other end of the vortex tube.

It has been found, quite surprisingly, that shifting a low-temperature generator, that hitherto had been provided only for external operation, into the main body of a cutting tool can be performed without disadvantages to the operation of same. The forwarding of the cold-gas flow into the immediate machine-cutting region is effected from the low-temperature generator, through continuation channels within the cutting tool, to the immediate machine-cutting region, without the need for an ever recurring setting and alignment of the coolant supply. Owing to a cutting tool being realized according to the invention, not only is the immediate machine-cutting region itself cooled in a superior manner but so also, in addition, is the entire main body of the tool through which the cold gas is routed. The heat produced during the machine cutting is thereby dissipated extremely rapidly away from the cutting insert, as a result of which the working life of the cutting insert is further increased and cutting-edge build-up is reduced.

Particularly simple mounting within the cutting tool is achieved in that the complete low-temperature generator is built into a corresponding receiving bore of the tool main body, into which receiving bore there open the further bores for forwarding the cold gas, supplying the compressed gas and carrying away the hot gas.

It is particularly advantageous if the supply of the compressed gas is effected via a bore in the tool main body parallelwise relative to the low-temperature generator. Under these conditions, the gas supply can be easily realized from the end of the cutting tool.

It is particularly favorable if an air-operated low-temperature generator is used. It is thereby normally possible to use the compressed-air supply present in each production.

Other features which are considered as characteristic for the invention are set forth in the appended claims.

Although the invention is illustrated and described herein as embodied in a cutting tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4A is a diagrammatic, front view of a cold-gas outlet for the rotary tool according to FIG. 1;

FIG. 4B is a diagrammatic, enlarged sectional view of the cold-gas outlet for the rotary tool according to FIG. 1.

DETAILED DESCRIPTION OF THE INVENTION

Figure 1:
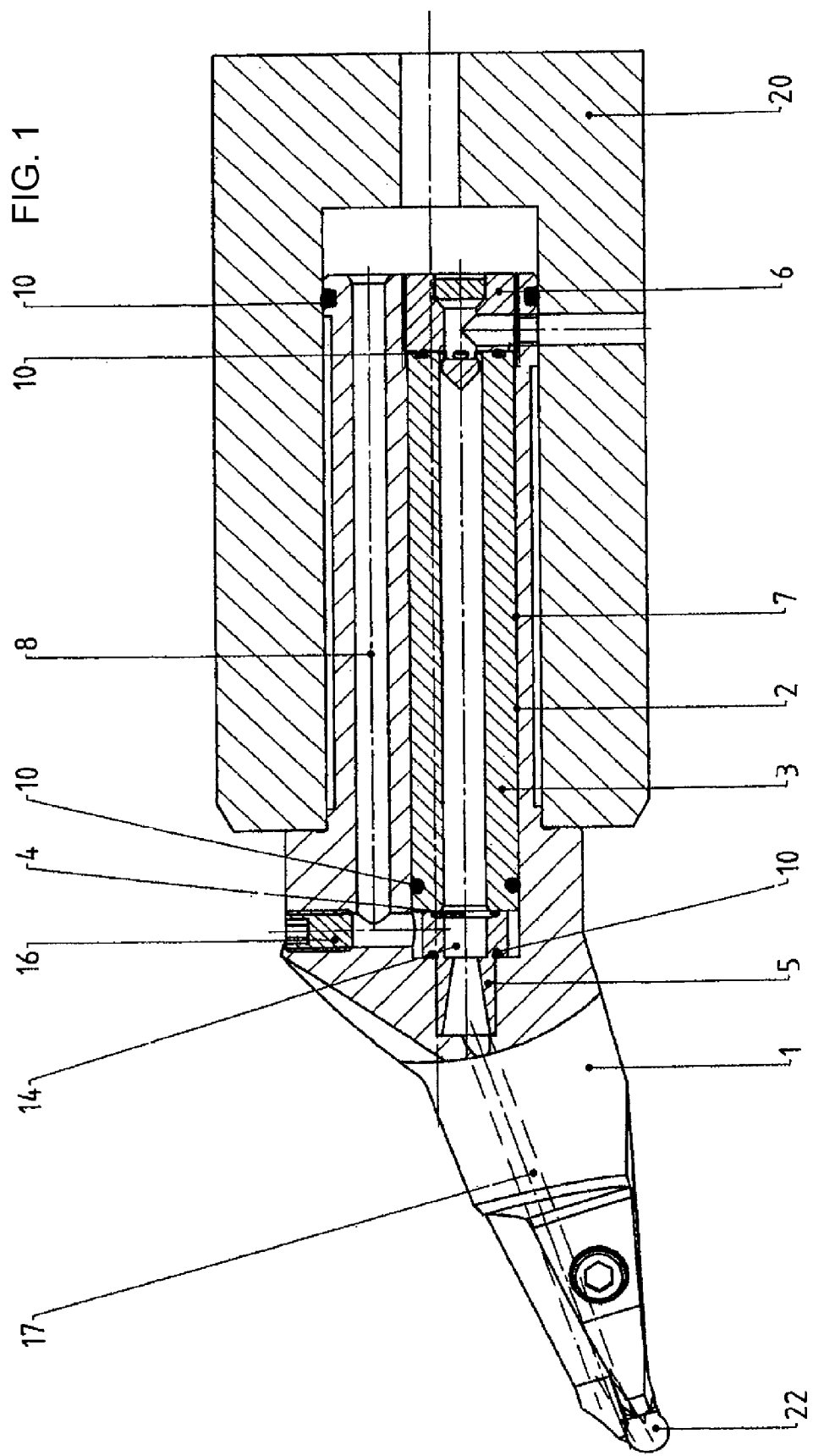
FIG. 1 is a diagrammatic, partial sectional view of a rotary tool according to the invention.
Figure 2:
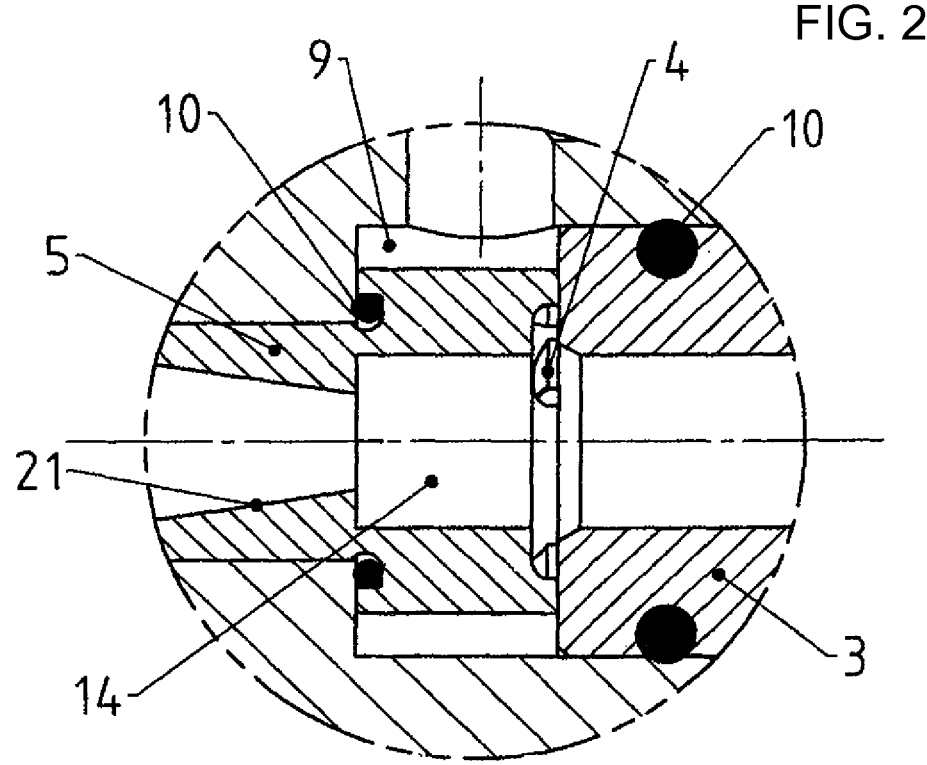
FIG. 2 is a diagrammatic, enlarged sectional view of a detail of the rotary tool according to FIG. 1.
Figure 3:
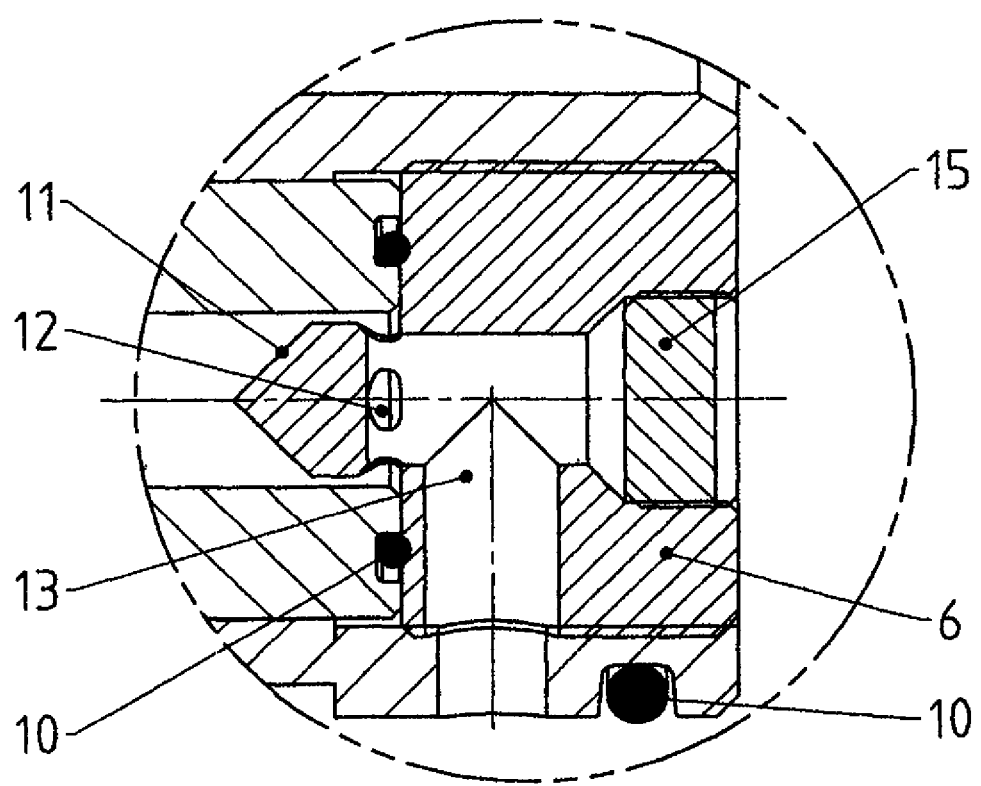
FIG. 3 is a diagrammatic, enlarged sectional view of a further detail of the rotary tool according to FIG. 1.
Figure 5:
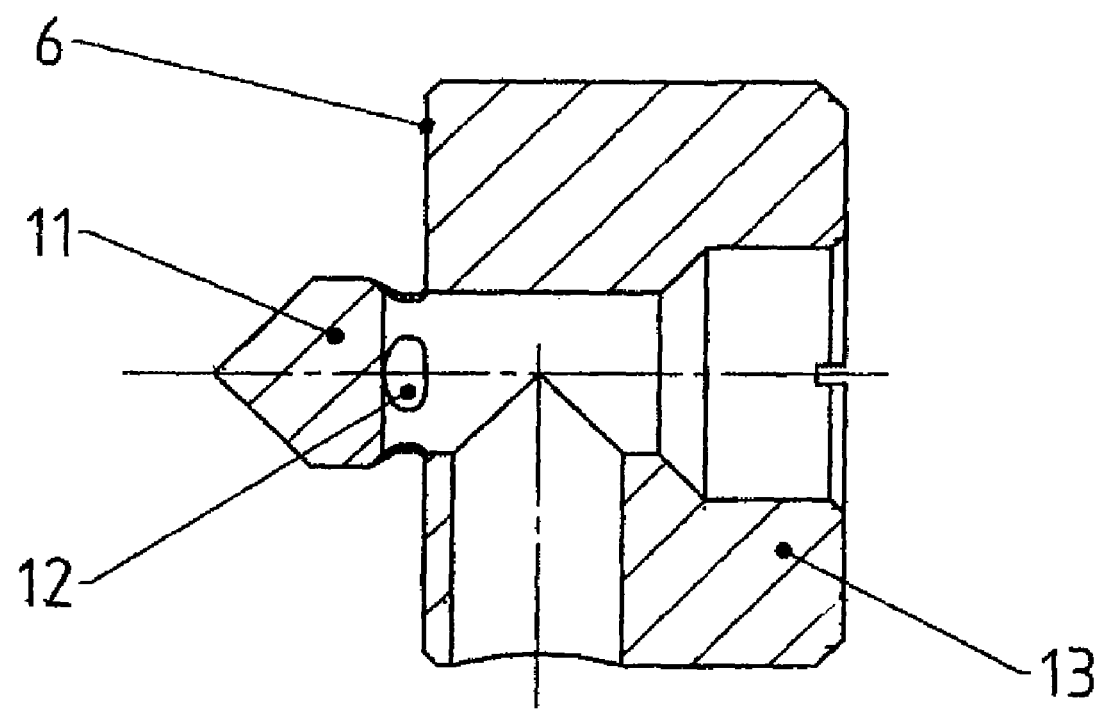
FIG. 5 is a diagrammatic, sectional view of a hot-gas outlet for the rotary tool according to FIG. 1

Referring now to the figures of the drawing in detail and first, particularly, to FIG. 1 thereof, there is shown a rotary tool having a tool main body 1, which is accommodated in a tool holder 20. A low-temperature generator 2 is integrated in a bore 7 made in the tool main body 1. The low-temperature generator 2 is formed of an elongate vortex tube 3 having a cold-gas outlet 5 at one end and a hot-gas outlet 6 at the other end. The cold-gas outlet 5, which is represented in yet greater detail in FIGS. 2, 4A and 4B, is realized integrally as a hollow cylindrical part having two portions of differing outer diameters that are offset from each other. The portion having the greater outer diameter directly adjoins the vortex tube 3 and, together with a bore, which corresponds approximately to an inner diameter of the vortex tube 3, forms a vortex chamber 14. The end of the cold-gas outlet 5 that adjoins the vortex tube 3 is closed by an annular face having slots 18 which adjoin the vortex chamber 14 tangentially and constitute a gas vorticizer 4. The portion of the cold-gas outlet 5 having the lesser outer diameter has, adjoining the vortex chamber 14, a bore 21, which widens outwards conically. The portion having the greater outer diameter has a somewhat smaller diameter than the receiving bore 7 in the tool main body 1, such that an annular chamber 9 is formed. A bore 8, for supplying a compressed gas, preferably in the form of compressed air, opens into the annular chamber 9. The bore 8, which initially extends parallelwise relative to the vortex tube 3, is diverted into a portion extending perpendicularly relative to the annular chamber 9. For technical production reasons, this portion extends through the entire tool main body 1, and is closed by a headless screw 16 towards the outside of the tool, in order to prevent compressed air from emerging outwards at this location. The conically widening bore 21 of the cold-gas outlet 5 opens into a bore 17 of the tool main body, which bore brings the cold air into an immediate vicinity of a cutting insert 22. The vortex tube 3 and the cold-gas outlet 5 are sealed against the receiving bore 7 by sealing rings 10. A hot-gas outlet 6 at the other end of the vortex tube 3 is formed of a cylindrical main body having an external thread, and of an inner bore 13, which is provided for carrying away the hot air, and is diverted laterally and closed backwardly by a headless screw 15. The hot-gas outlet 6 is screwed into the receiving bore 7, which at this location is provided with an internal thread, until it bears on the end of the vortex tube 3. The sealing rings 10 are also interposed for the purpose of sealing. The hot-gas outlet 6 has a centrally disposed compression cone 11 which engages, with a slight edge spacing, in the bore of the vortex tube 3. At the outlet of the compression cone 11, the latter has openings 12, via which the hot air passes into the bore 13 to be carried further outwards.

The functioning of the low-temperature generator 2 is such that compressed air is supplied to the annular chamber 9 of the low-temperature generator 2, at pressure of approximately 5 bar and at room temperature, initially via appropriate infeeds in the tool holder 20 and then via the bore 8 of the rotary tool. A higher pressure then builds up in the annular chamber 9, which pressure then forces the air into the vortex tube 3 via the slots 18 of the gas vorticizer 4. The air flow is brought into a circulating motion by the tangentially disposed slots 18, and moves at high speed along the inner wall of the vortex tube 3 to the hot-gas outlet 6 at the end of the vortex tube 3. Owing to the outlet area being constricted by the compression cone 11 of the hot-gas outlet 6, only a portion of the hot air can escape via the openings 12. The air that does not escape is forcibly routed back centrally within the high-speed air flow, at a substantially lower speed, in the direction of the cold-gas outlet 5, and thereby continuously gives off heat to the outer, high-speed air flow. When the inner air flow emerges through the cold-gas outlet 5, it has a very low temperature, of approximately 40° C.

The invention claimed is:

1. A cutting tool for machining by chip removal, the cutting tool comprising:
    a tool main body having an immediate machine-cutting region and an internal channel system formed therein for supplying a cold-gas flow for cooling said immediate machine-cutting region; and
    a low-temperature generator integrated into said tool main body, said low-temperature generator having an elongate vortex tube for converting a compressed gas, supplied via a gas vorticizer, from a normal temperature into the cold-gas flow and a warm-gas flow, said low-temperature generator further having a cold-gas outlet at a first end of said vortex tube and a hot-gas outlet at a second end of said vortex tube.

2. The cutting tool for machining by chip removal according to claim 1, wherein said tool main body has a receiving bore formed therein and said low-temperature generator is built into said receiving bore in a sealed manner.

3. The cutting tool for machining by chip removal according to claim 1, wherein said tool main body has a bore formed therein parallelwise relative to said low-temperature generator for supplying the compressed gas.

4. The cutting tool for machining by chip removal according to claim 1, wherein said low-temperature generator is air-operated.

5. A cutting tool for machining by chip removal, the cutting tool comprising:

a tool main body having an immediate machine-cutting region and an internal channel system formed therein for supplying a cold-gas flow for cooling said immediate machine-cutting region;

said tool main body having a bore formed therein communicating with said internal channel system; and a low-temperature generator disposed in said bore formed in said tool main body, said low-temperature generator having an elongate vortex tube for converting a compressed gas, supplied via a gas vorticizer, from a normal temperature into the cold-gas flow and a warm-gas flow, said low-temperature generator further having a cold-gas outlet at a first end of said vortex tube and a hot-gas outlet at a second end of said vortex tube.

* * * * *